United States Patent [19]

Allport

[11] Patent Number: 4,535,264

[45] Date of Patent: Aug. 13, 1985

[54] SLIP RING ASSEMBLY WITH INNER RECESS TO PREVENT SHORTING

[75] Inventor: Maurice J. Allport, Edgbaston, England

[73] Assignee: Lucas Industries Public Limited Company, Birmingham, England

[21] Appl. No.: 488,660

[22] Filed: Apr. 26, 1983

[30] Foreign Application Priority Data

May 6, 1982 [GB] United Kingdom ............. 8213148

[51] Int. Cl.³ .................................. H02K 39/08
[52] U.S. Cl. ................................... 310/232; 310/235
[58] Field of Search .......... 310/232, 234, 219, 233, 310/237, 235, 231, 236, 43; 29/597; 339/5 R, 8 R

[56] References Cited

U.S. PATENT DOCUMENTS

| 664,503 | 12/1900 | Reist ............................ 310/232 |
| 3,996,660 | 12/1976 | Hancock ...................... 310/235 |

FOREIGN PATENT DOCUMENTS

| 1167969 | 4/1964 | Fed. Rep. of Germany ...... 310/232 |
| 2311805 | 9/1973 | Fed. Rep. of Germany ...... 310/232 |
| 0930943 | 7/1963 | United Kingdom ................ 310/235 |
| 1208872 | 10/1970 | United Kingdom ................ 310/232 |

Primary Examiner—R. Skudy

[57] ABSTRACT

A slip ring assembly comprises an insulating body having a pair of slip rings on its external surface, each slip ring having electrically connected thereto a respective connector element a part of which is disposed radially inwardly of the slip rings. The body has an internal bore which receives a shaft of a rotary electric machine in use, a side wall of the bore being provided with axially extending recesses which are disposed radially inwardly of the connector element parts respectively. The presence of these recesses, which may alternatively be of helical or annular configuration, ensures that the connector elements do not contact the aforementioned shaft in operation and thereby create a short-circuit. The slip ring assembly is produced by placing the rings and the connector elements in an annular mould cavity whose radially inner surface has projections thereon which correspond to the desired configuration of the recesses in the completed assembly.

7 Claims, 6 Drawing Figures

SLIP RING ASSEMBLY WITH INNER RECESS TO PREVENT SHORTING

This invention relates to a small diameter slip ring assembly for a rotary electric machine, such as an a.c. generator or an alternator, and to a method of producing such an assembly.

Such assemblies normally comprise a body made of electrically insulating material which is mounted on a rotor shaft of the machine, slip rings secured to an external surface of the body in axially spaced relation, and electrical connectors each of which is electrically connected to a respective one of the slip rings, whereby current may be transferred to and from a rotor winding of the machine. Where the rotor shaft of the machine operates at high speed (such as is the case for a high speed alternator) it is most important that the external diameters of the slip rings should be kept as small as possible for a given output. This has the effect of reducing the peripheral velocity of the slip rings to a minimum so that surface temperature and wear of brushes which slidably engage the slip rings are maintained comparatively low. The use of small diameter slip rings also has the advantage that their small radial thickness enables heat to be dissipated readily to the rotor shaft.

As the diameter of the assembly is reduced, the radial thicknesses of the various components become so small that the components are fragile and can easily be deformed accidentally, either in handling during their assembly or by the flow pressure of the moulding material during formation of the insulating body. Since the clearance between the various components is already very small, such deformation can cause this clearance to be reduced to an unacceptable level and can even cause the conductive components to touch and provide a short-circuit. In principle it is possible to overcome this difficulty by inspecting each component fully both prior to and after the moulding process, but this is a very time-consuming operation.

It is an object of the present invention to obviate or mitigate the problem and disadvantages mentioned above.

According to one aspect of the present invention, there is provided a slip ring assembly comprising at least one electrically conductive slip ring, a body formed from electrically insulating material and supporting said at least one slip ring on an external surface thereof, and at least one electrically conductive connector element electrically connected to said at least one slip ring and having a part which is disposed inwardly of the latter and which is embedded in said body, the body having an internal bore for the reception in use of a shaft of a rotary electric machine, a side wall of the bore having therein recess means which is disposed radially inwardly of said part of said at least one connector element.

In this way, the recess means in use provides a positive clearance between said part of said at least one connector element and the shaft of the machine, thereby preventing these parts from shorting out. These parts may be further insulated from one anther if the body is secured to the machine shaft by means of an adhesive, since any excess adhesive will tend to accumulate in the recess means.

In a preferred example of the invention, the assembly is composed of a pair of axially spaced slip rings and a pair of connector elements each of which is electrically connected to a respective one of the slip rings, the connector element connected to one of the slip rings being passed through the inside of the other slip ring, and the recess means is provided radially inwardly of this connector element at least.

The recess means can extend axially of the insulating body, and may comprise a single recess or recesses extending continuously for substantially the whole axial length of said bore, a single recess or recesses extending axially only part-way along the bore, or a series of discrete recesses arranged in axially spaced relation. Alternatively, however, the recess means can extend helically along the bore.

According to a second aspect of the present invention, a method of producing a slip ring assembly comprises the steps of:

(a) providing an annular mould cavity whose radially inner surface has outwardly extending projection means thereon;

(b) disposing in said cavity a conductor assembly composed of at least one electrically conductive slip ring and at least one electrically conductive connector element electrically connected to said at least one slip ring and having a part which is disposed inwardly of the latter, the conductor assembly being so disposed that said projection means on the inner surface of the cavity is positioned radially inwardly of said part of said at least one connector element; and (c) filling said cavity with an electrically insulating material thereby to form a body in which said part of said at least one connector element is embedded.

In the finished assembly, the body thus has an internal bore whose side wall contains recess means which are defined by and complementary to the projection means of the inner surface of the cavity. As indicated previously, the presence of such recess means will prevent said at least one connector element shorting out with a shaft of a rotary electric machine when this is received in the bore in use.

Where for example the conductor assembly is composed of a pair of axially spaced slip rings and a pair of connector elements which are electrically connected to the slip rings respectively, in order to provide the greatest possible clearance between one slip ring and the connector element which is connected to the other slip ring, said part of said connector element is desirably urged into contact with the projection means on the inner surface of the mould cavity. In the case where the body is formed by injection moulding, this effect can be achieved by means of the flow pressure of the insulating material as it is injected into the mould cavity.

The projection means can extend axially of the mould cavity, and may comprise a single ridge or ridges extending continuously along the full axial length of said inner surface, a single ridge or ridges extending only part-way along said surface, or a series of discrete projections provided at axially spaced intervals on said surface. Alternatively, however, the projection means can extend helically along the mould cavity.

The projection means may form an integral part of the inner surface of the mould cavity, or may instead be in the form of a separate insert or separate inserts placed on said surface prior to moulding. For example in the case where the projection means extends helically of the mould cavity the insert could be constituted by a coil spring, and where the projection means extends circumferentially of the inner surface of the mould cavity a split ring or split rings could be employed.

The invention will now be further described, by way of example only, with reference to the accompanying drawings, in which.

Figure 1:
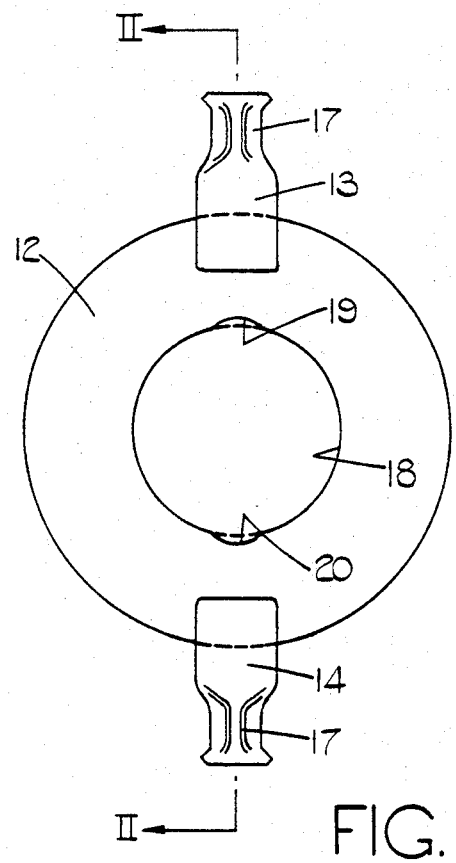
FIG. 1 is an end view of one embodiment of a slip ring assembly according to the present invention.
Figure 2:
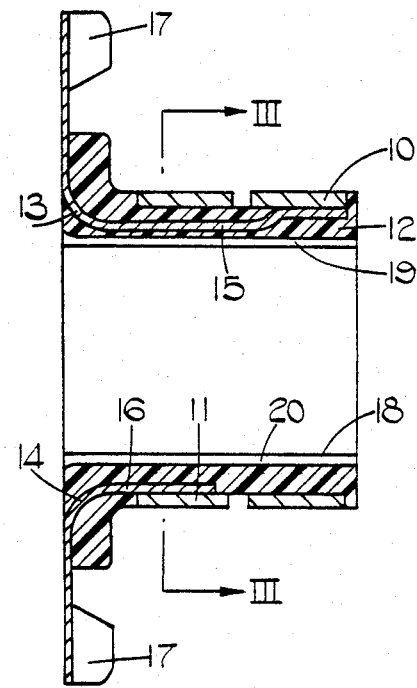
FIG. 2 is a sectional side view of the slip ring assembly, the section being taken along the line II—II in FIG. 1.
Figure 3:
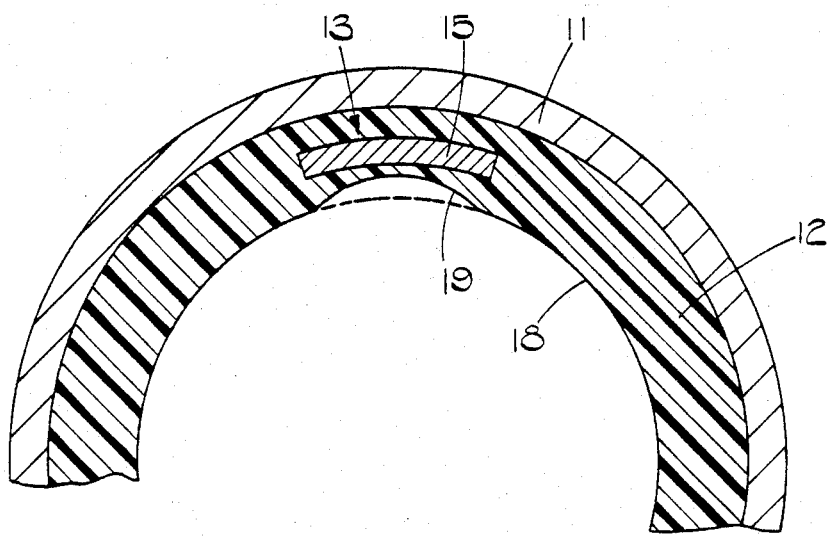
FIG. 3 is a part-sectional view taken on the line III—III in FIG. 1.

Referring first to FIGS. 1 to 3, the slip ring assembly illustrated therein is intended for mounting on a shaft (not shown) of a rotary electric machine, and comprises a pair of electrically conductive slip rings 10 and 11 which are secured to an external surface of a body 12 cast or moulded from electrically insulating material. Each of the slip rings 10 and 11 has a respective electrically conductive connector element 13, 14 electrically connected to its internal periphery, each of the connector elements having a part 15, 16 which is disposed inwardly of the slip rings 10, 11 and which is embedded in the body 12. As can be seen to advantage in FIGS. 2 and 3, the part 15 of the connector element 13 is passed through the inside of the slip ring 11. Each connector element 13, 14 terminates at an end thereof remote from the respective slip ring 10, 11 in a terminal portion 17 which may be crimped or otherwise secured to electrical leads (not shown) forming part of a rotor winding of the machine.

The insulating body 12 has a generally cylindrical internal bore 18 which receives the aforementioned shaft of the rotary electric machine. A side wall of the bore 18 is provided at two diametrically opposed points with respective recesses 19 and 20 which extend axially or linearly of the bore for the whole length of the latter. The recess 19 is disposed radially inwardly of the part 15 of the connector element 13 (see FIG. 3 in particular) to be interadjacent to the part 15, while the recess 20 is similarly disposed radially inwardly of the part 16 of the connector element 14 to be interadjacent. The recess extends substantially the entire axial extent of the part 15 and the purpose of these recesses is to separate the shaft from the body and to maintain a positive clearance between the connector element parts 15, 16 and the shaft of the rotary electric machine so that these parts do not short out. Although the slip ring assembly can be secured to the shaft of the machine by any convenient means, it is preferred that the body 12 is a simple push-fit on the shaft and that it is held in position by means of a suitable adhesive. In this case any excess adhesive will tend to accumulate in the recesses 19, 20 and will thereby contribute to the insulating effect of the latter. In the illustrated embodiment, recesses are provided for both of the connector elements 13 and 14. Since however the part 16 of the connector element 14 is very short, the danger of the part flexing sufficiently to contact the shaft of the rotary electric machine is somewhat reduced as compared with the part 15 of the connector element 13, and therefore it may be possible in certain circumstances to omit the recess 20.

Instead of extending for the whole axial length of the bore 18, one or both of the recesses 19 and 20 may extend only part way along the bore, or indeed may be replaced by a series of discrete recesses which are arranged in axially spaced relation along the bore. In the latter case, however, it will be necessary to use a more complicated moulding technique to ensure that the completed body 12 can be withdrawn from its mould.

Figure 4:
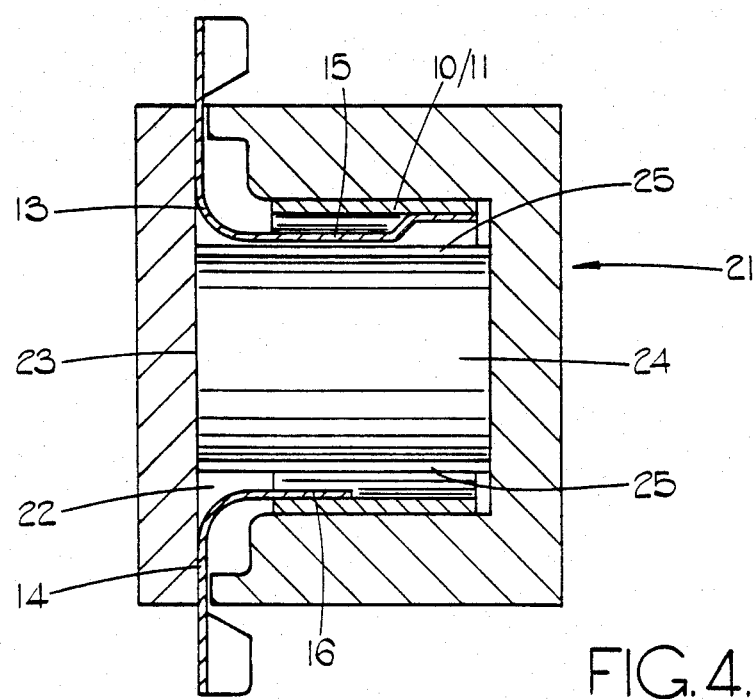
FIG. 4 is a sectional view of a mould during the manufacture of the slip ring assembly shown in FIGS. 1 to 3.

The slip ring assembly described above is produced in the following manner. Firstly, a mould 21 (see FIG. 4) having an annular cavity 22 defining the intended shape of the body 12 is provided, the mould including inter alia an inner part 23 whose external surface 24 defines the bore 18. On this surface 24 are provided projections 25 which define the shapes of the recesses 19 and 20: depending upon the intended configuration of these recesses, the projections 25 may take the form of ridges extending continuously for the full axial length of the mould cavity (as illustrated), ridges extending only part way along the cavity, or a series of discrete projections provided at axially spaced intervals. Into the mould cavity 22 is then placed a conductor assembly composed of the slip rings 10, 11 and the connector elements 13, 14, the conductor assembly being angularly oriented in the cavity such that the projections 25 on the cavity wall 24 are disposed radially inwardly of the connector element parts 15 and 16, respectively. The cavity 22 is then filled with electrically insulating material thereby to form the body 12 by casting or moulding. During this operation the projections 25 on the cavity wall 24 limit the amount by which the connector element parts 15 and 16 can be displaced inwardly, so that these parts are prevented from reaching positions wherein, in the finished slip ring assembly, there would be a danger of them shorting out on the shaft of the rotary electric machine. Finally, the completed slip ring assembly is removed from the mould 21 and the external surfaces of the slip rings 10 and 11 are ground for accurate concentricity with the bore 18 in the body 12.

Figure 5:
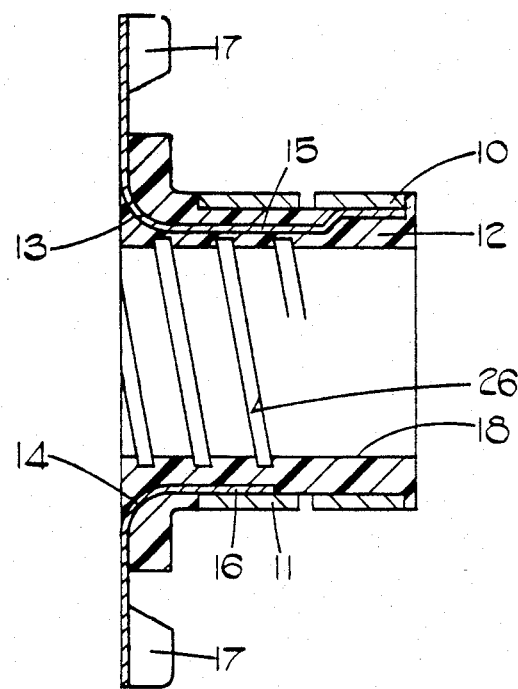
FIG. 5 is a sectional side view of a second embodiment of a slip ring assembly according to the present invention.
Figure 6:
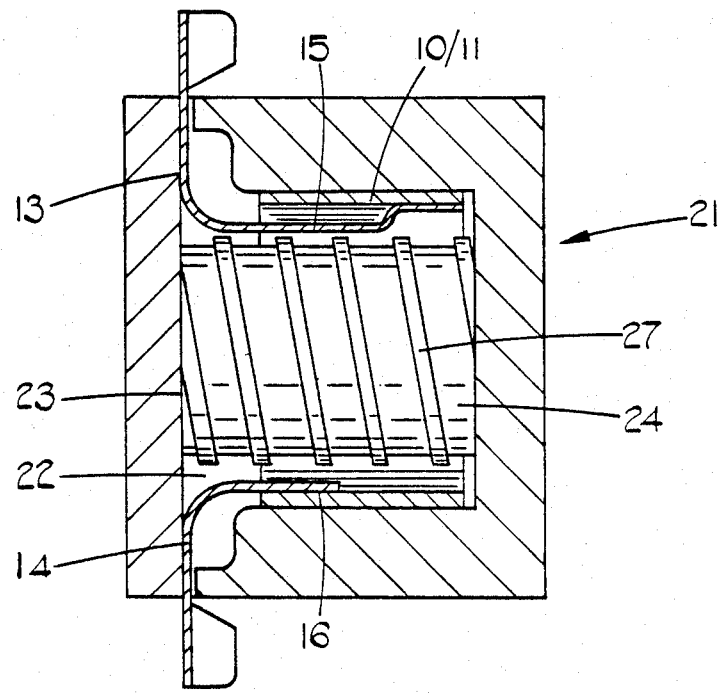
FIG. 6 is a sectional view of a mould during the manufacture of the slip ring assembly shown in FIG. 5.

The slip ring assembly shown in FIG. 5 is generally similar to that described above, with reference to FIGS. 1 to 3, except that the recesses 19 and 20 are replaced by a groove 26 which extends helically along the bore 18. The flights of the helix effectively form a series of axially spaced recesses disposed radially inwardly of each connector element part 15, 16 thereby ensuring the necessary clearance between these parts of the shaft of the machine. The slip ring assembly is manufactured in exactly the same manner as explained previously, except that as shown in FIG. 6 the surface 24 of the inner mould part 23 has a helical projection 27 on its periphery to define the groove 26 in the finished body 12. This projection 27 may be formed integrally with the inner mould part 23, in which case the body 12 is removed from the mould 21 either by unscrewing the inner mould part 23 from the bore 18 and then subsequently withdrawing the body from the outer mould part with the moulded body thereon and then unscrewing the body by hand from the inner mould part. More conveniently, however, the helical projection 27 is in the form of a separate insert (e.g. a coil spring) which is placed over the inner mould part 23 prior to moulding. The finished body together with the insert can then be removed from the mould in a conventional manner, with the insert subsequently being radially contracted to permit its removal from the bore 18.

It will be manifest that, in the embodiment of FIG. 5 the conductor assembly can be inserted into the mould in any angular orientation since the connector element parts 15 and 16 will always have respective parts of the helical projection or insert disposed radially inwardly thereof to limit their inward movement during moulding of the body 12.

The connector elements 13 and 14 are inherently resilient and as a result, in all of the embodiments described above, the part 15 of the element 13 will to a certain extent be biased away from the internal periphery of the slip ring 11 where it passes through the inside of latter, thereby preventing these parts from shorting out. This effect can however be maximised while at the same time ensuring that the part 15 will not contact the shaft of the rotary electric machine by arranging for this natural bias to urge the part 15 into contact with the respective projection or insert 27 or 29 on the moulding cavity wall 23. Where the body 12 is produced by injection moulding, the mould 21 can be designed so that the moulding material as it flows into the cavity 22 also acts to urge the part 15 against the projection or insert.

For ease of manufacture, the slip rings 10 and 11 preferably form part of a single electrically conductive annular member when they are inserted into the mould cavity (in the manner indicated in FIGS. 4, 6 and 8) and are separated by making a circumferential cut in the annular member after the body moulding process has been completed.

The production technique described above ensures that a positive clearance is provided between the connector elements 13, 14 and the shaft of the rotary electric machine. Where the slip ring assembly is designed for low voltage applications, this clearance can be made extremely small thereby providing the greatest possible clearance between the connector element part 15 and the slip ring 11.

I claim:

1. A slip ring assembly for a rotary electric machine, comprising a body formed from electrically insulating material and having an external surface, at least one electrically conductive slip ring supported on said external surface of said body, and at least one electrically conductive connector element electrically connected to said at least one slip ring and extending axially of said body, said at least one connector element having a part which is disposed inwardly of said at least one slip ring and which is embedded in said body, said body having an internal bore which is adapted to receive a shaft of said rotary electric machine, the internal bore being provided with recess means for maintaining a positive clearance between said connector element and the shaft to prevent shorting of said connector element and the shaft, said recess means being defined in the surface of said body adjacent to said internal bore and extending axially of said body for substantially the entire axial extent of said port along said body, said recess means being disposed radially inwardly of said part of said at least one connector element to be interadjacent thereto and interposed between said connector element and the shaft whereby the shaft is separated from said body adjacent to said part by said recess means.

2. The slip ring assembly according to claim 1, wherein a further slip ring is supported on said external surface of said body in axially spaced relation with said one electrically conductive slip ring, and a part of a second connector element is electrically connected to said further slip ring.

3. The slip ring assembly according to claim 1, wherein the recess means extends linearly along the internal bore in said body.

4. The slip ring according to claim 3, wherein the recess means comprises at least one recess which extends for substantially the whole axial length of the internal bore.

5. The slip ring assembly according to claim 3, wherein the recess means comprises at least one recess which extends axially only part-way along the internal bore.

6. The slip ring assembly according to claim 3, wherein the recess means comprises a series of discrete recesses arranged in axially spaced relation along the internal bore.

7. The slip ring assembly according to claim 1, wherein the recess means extends helically along the internal bore.

* * * * *